United States Patent
Lim et al.

(10) Patent No.: US 8,112,783 B2
(45) Date of Patent: Feb. 7, 2012

(54) METHOD OF CONTROLLING OUPUT TIME AND OUTPUT PRIORITY OF CAPTION INFORMATION AND APPARATUS THEREOF

(75) Inventors: Dong-keun Lim, Suwon-si (KR); Tae-hee Kim, Yongin-si (KR); Byong-ki Lee, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1775 days.

(21) Appl. No.: 11/341,441

(22) Filed: Jan. 30, 2006

(65) Prior Publication Data
US 2006/0170819 A1   Aug. 3, 2006

(30) Foreign Application Priority Data
Jan. 29, 2005   (KR) .................. 10-2005-0008348

(51) Int. Cl.
*H04N 7/12* (2006.01)
*H04N 11/02* (2006.01)
(52) U.S. Cl. ........................................ 725/136; 348/468
(58) Field of Classification Search .................. None
See application file for complete search history.

(56) References Cited

U.S. PATENT DOCUMENTS

| | | | |
|---|---|---|---|
| 6,175,573 B1 * | 1/2001 | Togo et al. | 370/474 |
| 6,567,409 B1 * | 5/2003 | Tozaki et al. | 370/395.64 |
| 7,561,779 B2 * | 7/2009 | Yahata et al. | 386/239 |
| 2002/0124253 A1 * | 9/2002 | Eyer et al. | 725/34 |
| 2004/0237123 A1 * | 11/2004 | Park | 725/136 |
| 2007/0009049 A1 * | 1/2007 | Sullivan | 375/240.28 |
| 2007/0234395 A1 * | 10/2007 | Dureau et al. | 725/135 |

FOREIGN PATENT DOCUMENTS

| | | |
|---|---|---|
| KR | 10-2000-0066694 A | 11/2000 |
| KR | 10-2001-0001243 A | 1/2001 |
| KR | 10-2002-0026622 A | 4/2002 |
| KR | 1020020085490 | * 12/2002 |
| KR | 10-2004-0058969 A | 7/2004 |
| WO | WO 2004082274 A1 | * 9/2004 |

OTHER PUBLICATIONS

English translation of KR1020020085490 document "1020020085490_KR_APP.pdf" DOP: May 7, 2004, Lee, Byeong Ho.*
Machine Translation of WO 2004 082274 A1.*

* cited by examiner

*Primary Examiner* — Andrew Koenig
*Assistant Examiner* — Rong Le
(74) *Attorney, Agent, or Firm* — Sughrue Mion, PLLC

(57) ABSTRACT

An apparatus and a method of arbitrarily adjusting the output time of caption information included in a received multimedia transport stream for broadcasting, by user input. The method includes: receiving an input of a time value for adjusting the output time of caption information, from a user through a user interface; by demultiplexing the multimedia transport stream, dividing the transport stream into video, audio, and data packets, decoding each packet, and storing the decoded packets in buffers corresponding to a type of each packet; resetting the output time of the caption information by adding the input time value to or subtracting the input time value from the output time included in the video or audio packet; and according to the output time of the reset caption information, blending the data stored in the buffer with the video information and presenting the blended information on the screen.

13 Claims, 15 Drawing Sheets

FIG. 12

| CAPTION OUTPUT CLASS | 0 | 1 | 2 | 3 | 4 |
|---|---|---|---|---|---|
| PRICE PER SECOND | 100 | 80 | 60 | 40 | 20 |
| OUTPUT PRIORITY | HIGHEST | HIGH | NORMAL | LOW | LOWEST |

METHOD OF CONTROLLING OUPUT TIME AND OUTPUT PRIORITY OF CAPTION INFORMATION AND APPARATUS THEREOF

CROSS-REFERENCE TO RELATED PATENT APPLICATIONS

This application claims the benefit of priority from Korean Patent Application No. 10-2005-0008348, filed on Jan. 29, 2005, in the Korean Intellectual Property Office, the disclosure of which is incorporated herein in its entirety by reference.

BACKGROUND OF THE INVENTION

1. Field of the Invention

The present invention relates to a reproduction of a multimedia transport stream for broadcasting and, more particularly, to a method and an apparatus of adjusting the output and output priority time of caption information included in a received multimedia transport stream for broadcasting.

2. Description of the Related Art

A broadcasting reception apparatus, such as a set-top box (STB) and a digital TV, receives a digital broadcasting signal through a sky wave or a satellite. The digital broadcasting signal is a transport stream obtained by multiplexing video, audio, and data information complying with the moving picture experts group (MPEG) standard, and is received in units of packets by the broadcasting reception apparatus. In particular, the data information includes caption information for additional functions, such as a caption, teletext, and advertisement, which are output together with video and/or audio information. When digital broadcasting is watched, the caption information can provide a variety of additional functions. For example, in case of foreign language broadcasting, the contents of a voice currently being output can be displayed in a foreign language caption. This is very convenient for users who want to study the foreign language. Also, though sometimes the sign language is shown on a part of the screen for deaf or hard of hearing people, the caption information can be used to display a caption for these people.

The video and audio signals decoded in the broadcasting reception apparatus are output, by synchronizing the video and audio output time points by using presentation timestamps (hereinafter referred to as PTS) included in video and audio packets, respectively. However, in case of the data packet for the caption information, the data packet is received and begins to be decoded later than the video packet or the audio packet. Accordingly, since the presentation time is late, the data packet may not correspond with the video screen.

Therefore, it is needed that a data signal including caption information is output after being accurately synchronized with the video and audio signals. Meanwhile, for the purpose of the foreign language study, in order to display a caption after audio information is output, or in order to output audio information after a caption is first displayed, it may be necessary for a user to arbitrarily adjust the output time of the caption information.

Meanwhile, with the development of digital broadcasting technologies, caption information can be output together with audio, such as subtitle, teletext, and advertisement. When a plurality of caption information items are provided at the same time to users, those items are overlapped according to provided broadcasting programs, such that the caption information cannot be smoothly used.

SUMMARY OF THE INVENTION

The present invention provides an apparatus for and a method of adjusting the output time of caption information included in a received multimedia transport stream for broadcasting so that video, audio and data signals are all synchronized.

The present invention may also provide an apparatus for and a method of arbitrarily adjusting the presentation timestamp of caption information included in a received multimedia transport stream for broadcasting, according to the input of a user.

The present invention may also provide a method and an apparatus capable of displaying only desired caption information on a desired position of a screen according to an input from a user, from among a plurality of caption information items included in a received broadcasting multimedia transport stream.

Illustrative, non-limiting embodiments of the present invention may overcome the above disadvantages and other disadvantages not described above. The present invention is not necessarily required to overcome any of the disadvantages described above, and the illustrative, non-limiting embodiments of the present invention may not overcome any of the problems described above. The appended claims should be consulted to ascertain the true scope of the invention.

According to an aspect of the present invention, there is provided a method of adjusting the output time of caption information included in a multimedia transport stream. The method includes: receiving an input of a time value for adjusting the output time of caption information, from a user through a user interface. The method further includes by demultiplexing the multimedia transport stream, dividing the transport stream into video, audio, and data packets, decoding each packet, and storing the decoded packets in buffers corresponding to a type of packet; resetting the output time of the caption information by adding the input time value to or subtracting the input time value from the output time point included in the video or audio information; and according to the output time of the reset caption information, blending the data packets in the buffer with the video information and presenting the blended information on the screen.

In the receiving of the input, the user interface may include a remote controller, a direction key, or a jog/shuttle.

The input time value may be a relative value that is added to or subtracted from the output time of the video or audio information.

The buffer may include a data buffer, and may further include a video buffer and/or an audio buffer.

The output time may be a presentation timestamp.

The multimedia transport stream may be a stream multiplexed in order of video, audio, and data information.

The multimedia transport stream may be a stream multiplexed in order of data, video, and audio information.

According to another aspect of the present invention, there is provided a computer readable recording medium having embodied thereon a computer program for executing each operation of the method.

According to yet another aspect of the present invention, there is provided an apparatus for adjusting the output time of caption information included in a multimedia transport stream. The apparatus includes: a user interface receiving an input of a time value for adjusting the output time of caption information, from a user through a user interface; a decoding unit, by demultiplexing the multimedia transport stream, dividing the transport stream into video, audio, and data packets, decoding each packet, and storing the decoded packets in buffers corresponding to a type of packet; an output time adjusting unit resetting the output time of the caption information by adding the input time value to or subtracting the input time value from the output time included in the video or audio packet; and an output unit, according to the output time of the reset caption information, blending the data packets stored in the buffer with the video information and presenting the blended information on the screen.

BRIEF DESCRIPTION OF THE DRAWINGS

The present invention will now be described in detail by describing illustrative, non-limiting embodiments thereof with reference to the accompanying drawings. In the drawings, the same reference characters denote analogous elements:

FIG. 12 illustrates caption output classes showing output priorities of caption information according to an exemplary, non-limiting embodiment of the present invention;

DETAILED DESCRIPTION OF EXEMPLARY EMBODIMENTS OF THE INVENTION

The present invention will now be described more fully with reference to the accompanying drawings, in which exemplary, non-limiting embodiments of the present invention are shown.

Figure 1:
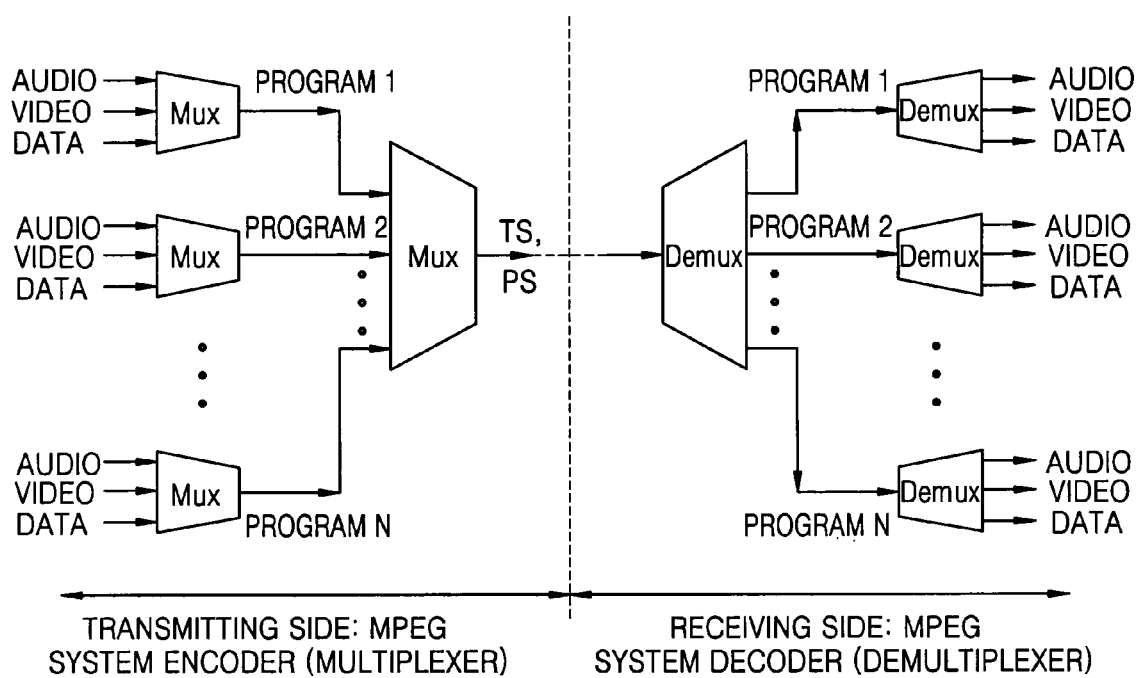
FIG. 1 illustrates a process for multiplexing and demultiplexing a multimedia transport stream according to an exemplary, non-limiting embodiment of the present invention.

FIG. 1 illustrates a process for multiplexing and demultiplexing a multimedia transport stream according to an exemplary, non-limiting embodiment of the present invention. Referring to FIG. 1, a broadcasting transmission apparatus of a transmission side of digital broadcasting, such as a broadcasting station, broadcasts a multimedia transport stream obtained by multiplexing audio, video, and data packets complying with the MPEG standard. Specifically, as depicted in FIG. 1, audio, video, and caption data of programs 1, 2, . . . n are multiplexed together. Then, the multiplexed multimedia stream of each program is further multiplexed with the multimedia stream of other programs.

A broadcasting reception apparatus, such as a set-top box and a digital TV, receives the multimedia transport stream and demultiplexes the transport stream into a respective program and then divides the multimedia stream of the respective program into video, audio, and data packets. Also, the broadcasting reception apparatus decodes each packet using a video decoder, an audio decoder, and a data decoder, and outputs the decoded signal to the screen and to a speaker.

In brief, at the transmission side, the multimedia transport stream is obtained by multiplexing the video, audio and data packets in order, and transmitted, and at the reception side, the multimedia transport stream is demultiplexed into the video, audio and data packets in the same order and is decoded. At this time, the decoded video, audio and data are stored in an internal memory of the broadcasting reception apparatus. The stored decoded results are output on the display screen or to the speaker at their respective presentation timestamps (PTS).

Meanwhile, in a multimedia recording apparatus such as a personal video recorder (PVR) or a DVD recorder, for recording the received multimedia transport stream for broadcasting on a storage medium such as an optical disk, or in a multimedia reproducing apparatus such as a DVD player, for decoding and reproducing the multimedia transport stream for broadcasting recorded on the storage medium, a similar multiplexing or demultiplexing process is performed.

Hereinafter, the broadcasting reception apparatus and the multimedia reproducing apparatus that decode the multimedia transport stream will be collectively referred to as "a multimedia apparatus" for the sake of linguistic convenience only.

Meanwhile, in the multimedia apparatus, in case of video and audio, if decoding of the demultiplexed video or audio is finished, the decoded result is output at the PTS included in the video or audio packet. Accordingly, only after the decoding of the video or audio packet is finished, a data packet recorded behind the video or audio packet in the packet storage structure is decoded, overlaid onto the video screen, and output. Accordingly, compared to the outputs of the video and audio, the output of the caption information can be delayed. This is because a time for rendering the data including the caption information as graphic, and overlaying (also referred to as 'blending') the graphic onto the video screen is taken.

A multimedia apparatus 1 for adjusting the PTS of caption information according to an exemplary, non-limiting embodiment is described with reference to FIG. 2 Referring to FIG. 2, the multimedia apparatus 1 includes a decoding unit, an output unit, a screen output time adjusting unit 70, and a user interface 80. The decoding unit includes a demultiplexer 10, storage buffers 20 for respective types of packets, decoders 30 for the respective types of packets, a video buffer 40, an audio buffer 50, and a data buffer 60. The output unit includes a blender 90, a video/audio/data combining buffer 92, a display 94, and a speaker 96.

First, through the demultiplexer 10, a multimedia transport stream is demultiplexed into video packets, audio packets, and data packets, and the demultiplexed packets are respectively stored temporarily in the video packet storage buffer, the audio packet storage buffer, and the data packet storage buffer which form the storage buffers 20. Each of the stored packets is decoded in the corresponding decoder among the video, audio, and data decoders 30 at the decoding timestamp (DTS) of the packet complying with the MPEG standard.

Meanwhile, in the conventional multimedia apparatus, the decoded results are immediately overlaid and stored in the video/audio/data combining buffer (also referred to as a "graphic plane") and then, output at the corresponding PTS. However, in the multimedia apparatus 1 according to an exemplary embodiment of the present invention, the decoded results are temporarily stored in the corresponding one of the video buffer 40, the audio buffer 50, and the data buffer 60. Also, through the user interface 80, such as a remote controller, a direction switch, and a jog/shuttle, an input by the user of a time is received and transferred to the screen output time adjusting unit 70. The screen output time adjusting unit 70 resets the PTS of a data packet, by advancing or delaying the PTS of the data packet to the extent indicated by the time input by the user with reference to the PTS of a video or audio packet. Accordingly, the PTS of the caption information can be arbitrarily adjusted according to the input of the user.

An exemplary method of arbitrarily adjusting the PTS of the caption information based on the structure of the multimedia apparatus 1 described above will now be explained in detail. First, a method (according to a first, exemplary, non-limiting embodiment of the present invention) of arbitrarily adjusting the PTS of caption information by using the conventional multimedia transport stream without modifying the order of the packets in the multimedia transport stream for broadcasting will be explained with reference to FIGS. 3 and 4. Then, a method (according to a second, exemplary, non-limiting embodiment of the present invention) of arbitrarily adjusting the PTS of caption information by changing the packet order of the multimedia stream for broadcasting will be explained with reference to FIGS. 5 and 6.

Figure 3:
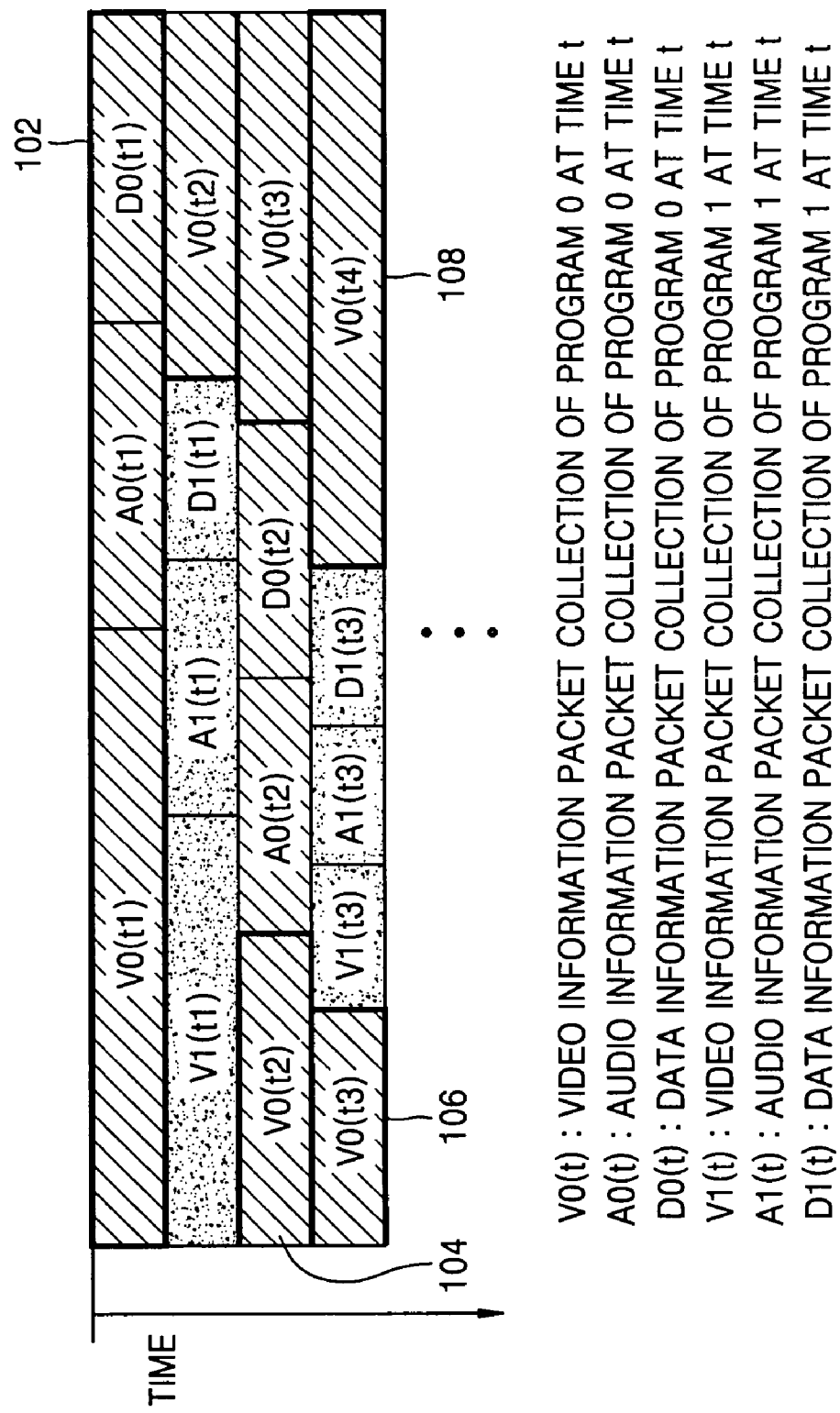
FIG. 3 illustrates a multimedia transport stream according to an exemplary, non-limiting embodiment of the present invention.

First, FIG. 3 illustrates a conventional multimedia transport stream, in which the order of the packets is not changed for broadcasting according to the first embodiment of the present invention.

Referring to FIG. 3, an exemplary one multimedia transport stream constructed by receiving and multiplexing video, audio, and data information forming a program in a broadcasting transmission apparatus is shown. In the multimedia transport stream, multiplexing is performed in order of video information, audio information, and data information. Parts marked by shading lines indicate video, audio, and/or data information of program 0, and include video, audio and/or data information 102 at t1, video, audio and/or data information 104 at t2, video, audio and/or data information 106 at t3, and video, audio and/or data information 108 at t4. Each of video, audio and data information items is formed with a set of packets each packet having a size of 188 bytes, for example. Parts marked by shading dots indicate video, audio, and/or data information of program 1.

Figure 4:
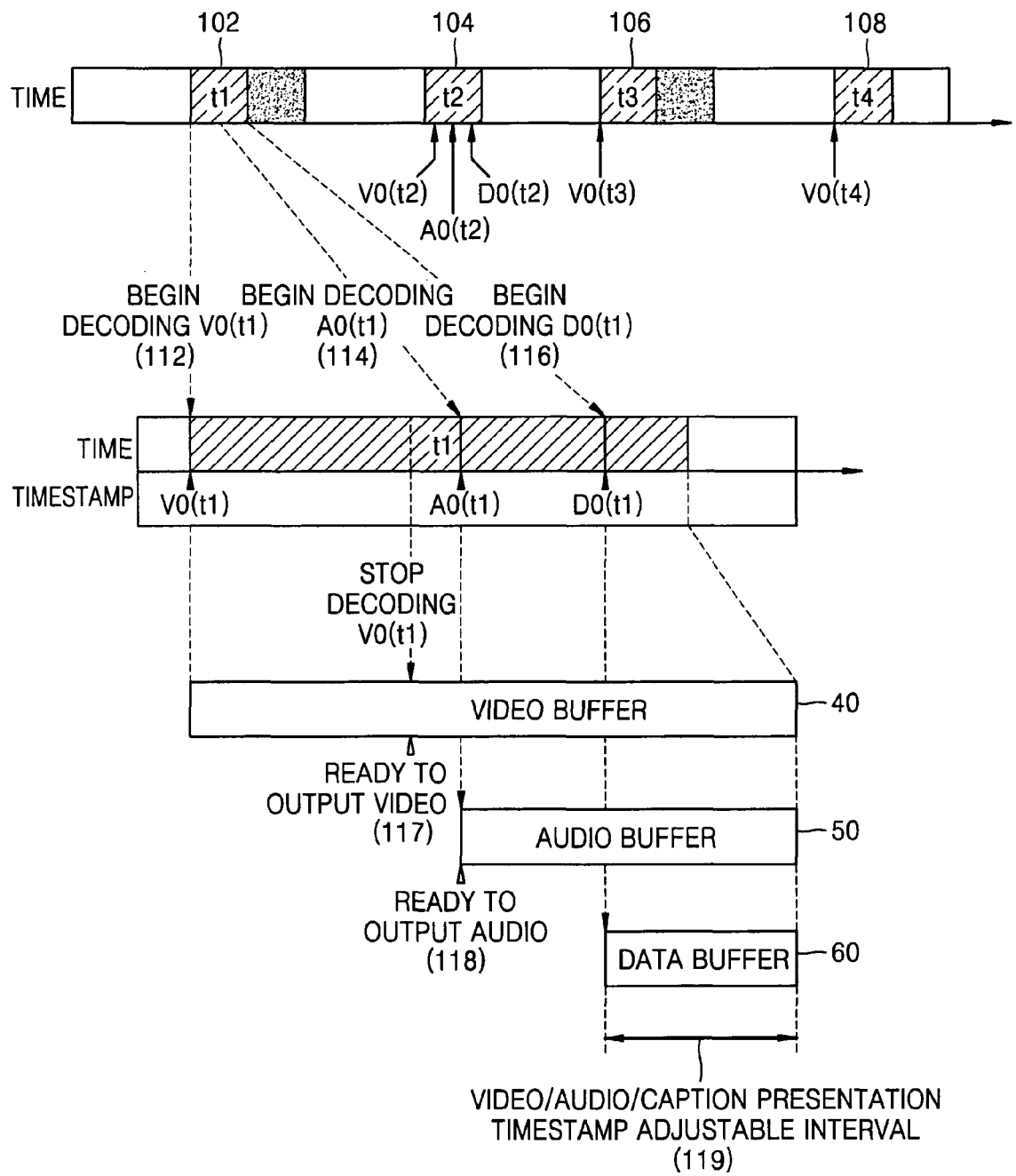
FIG. 4 illustrates a process for decoding and outputting the multimedia transport stream according to an exemplary, non-limiting embodiment of the present invention.

FIG. 4 illustrates a process for decoding and outputting the conventional multimedia transport stream such as the one shown in FIG. 3, according to the first embodiment of the present invention.

Referring to FIG. 4, the process for decoding and outputting the video, audio and/or data information 102 at t1, the video, audio and/or data information 104 at t2, the video, audio and/or data information 106 at t3, and the video, audio and/or data information 108 at t4 included in the program 0 is expressed on a time axis. FIG. 4 illustrates in greater detail the process for decoding and outputting the video, audio, and/or data information 102 at t1.

In each of the video, audio, and/or data information items, the DTS that is a time for decoding the packet is included. For example, in the video information V0(t1) at t1, a DTS 112 is included and at the DTS 112, decoding of the video information begins. Also, in the audio information A0(t1) at t1, a DTS 114 is included and at the DTS 114, decoding of the audio information begins. Likewise, a DTS 116 is included in the data information D0(t1) and at the DTS 116, decoding of the data information begins. Before being blended in the blender 90, the decoded results are stored in the video buffer 40, the audio buffer 50, and the data buffer 60, respectively, which are described above, and are awaiting presentation. Thus, by storing the decoded results in the respective buffers, the presentation of the video, audio, and data can be made from the time point 116 when the decoding of the data begins.

Also, the output of the video information is possible from the time point 117 when the decoding of the video information is finished or the output of the audio information is possible at the time point 118 when the decoding of the audio information is finished. However, in order to synchronize with the caption information or in order to adjust the PTS of the caption information, the screen output time adjusting unit 70 described above can adjust the PTS of video, audio, and/or data information so that the video, audio, and/or data information is presented in a PTS adjustable interval 119 after the time point 116 when the decoding of the data information begins. This is possible because according to an exemplary embodiment of the present invention the decoded results are stored in the corresponding buffer, which is one of the video buffer 40, the audio buffer 50, and the data buffer 60 described above, before the decoded results are blended in the blender 90.

Accordingly, by adjusting and synchronizing the PTSs of the video, audio, and/or data information, the information can be output. In addition, by applying a time input by the user to the PTSs of the video, audio, and data information, the PTS of caption information can be arbitrarily adjusted. For example, the caption information can be output before the video information or can be delayed and output after the video information. Accordingly, in the first embodiment of the present invention the PTS of caption information may be adjusted without any modifications in the order of video, audio, and data information of the conventional transport stream.

Next, as the exemplary second embodiment of the present invention, a method of arbitrarily adjusting the PTS of caption information by changing the packet order of a multimedia stream for broadcasting will now be described.

Figure 5:
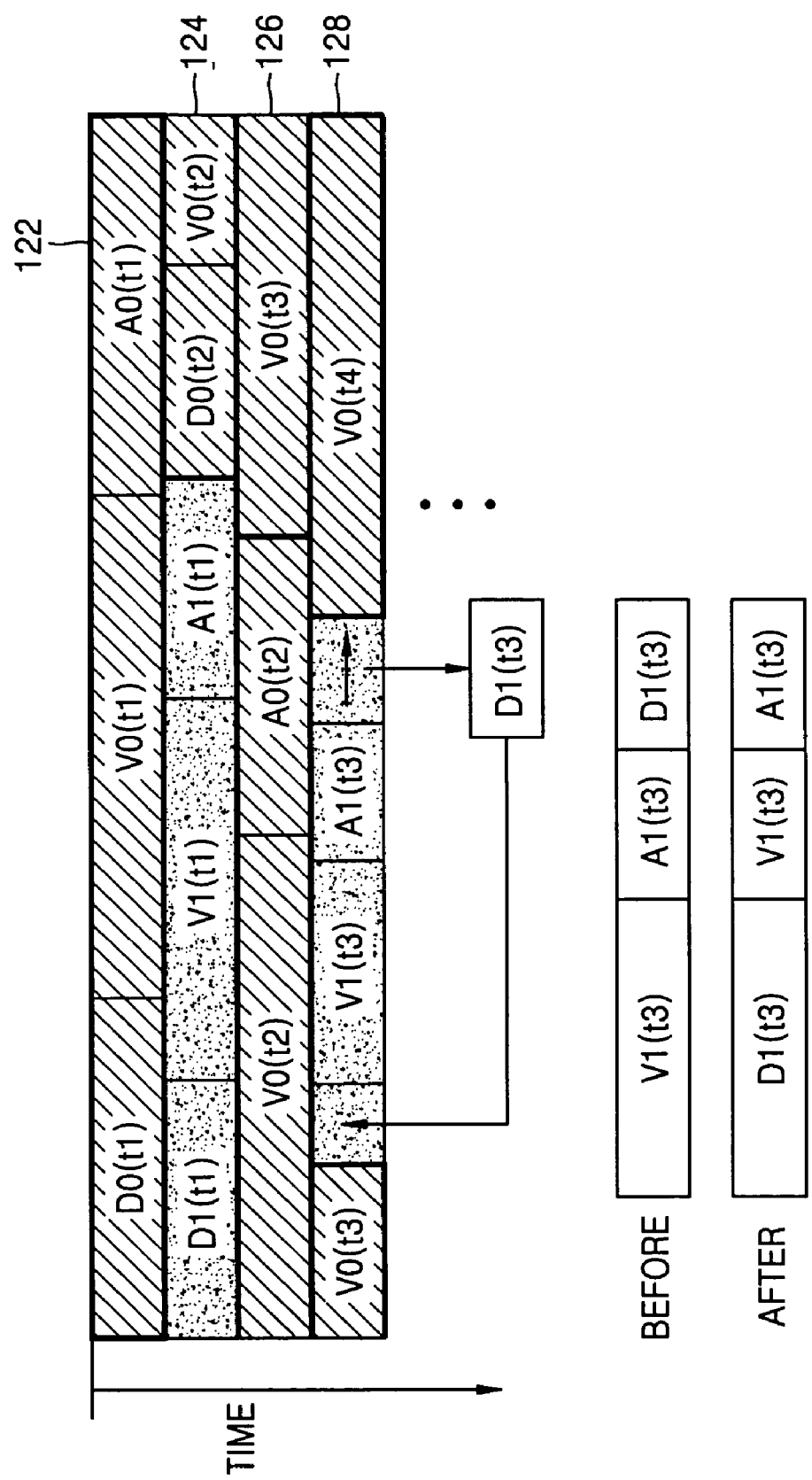
FIG. 5 illustrates a multimedia transport stream according to another exemplary, non-limiting embodiment of the present invention.

FIG. 5 illustrates another exemplary embodiment of a multimedia transport stream.

Referring to FIG. 5, a multimedia transport stream for broadcasting constructed by changing the transmission order of packets and by multiplexing packets in a broadcasting transmission apparatus. In the multimedia transport stream, according to this other embodiment of the present invention, multiplexing is performed in order of data information, video information and audio information. Parts marked by shading lines indicate data, video, and/or audio information of program 0, and include data, video, and/or audio information 122 at t1, data, video, and/or audio information 124 at t2, data, video, and/or audio information 126 at t3, and data, video, and/or audio information 128 at t4. Each of video, audio and data information items is formed with a set of packets each packet having a size of 188 bytes, for example. Parts marked by shading dots indicate data, video, and/or audio information of program 1.

If the transmission side thus changes the packet order so that the packets are in order of data, video, and/or audio information, and then multiplexes and broadcasts the packets, the multimedia apparatus 1 at the reception side receives the multimedia transport stream multiplexed in order of data, video, and/or audio information, and processes the stream.

Figure 6:
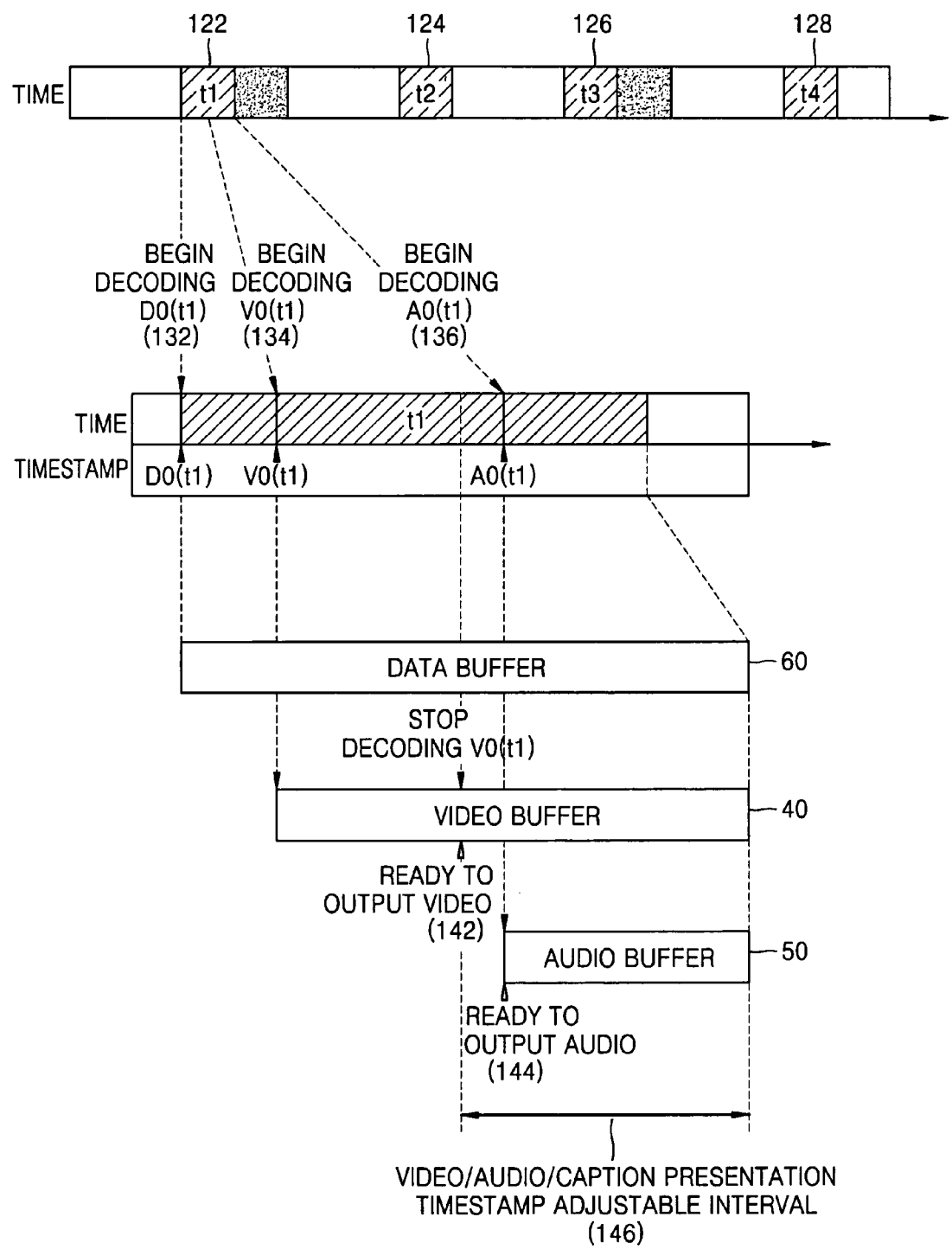
FIG. 6 illustrates a process for decoding and outputting the multimedia transport stream according to another exemplary, non-limiting embodiment of the present invention.

FIG. 6 illustrates a process for decoding and outputting the multimedia transport stream in which packet order was modified such as the multimedia transport stream shown in FIG. 5,.

Referring to FIG. 6, the process for decoding and outputting the data, video, and/or audio information 122 at t1, the data, video, and/or audio information 124 at t2, the data, video, and/or audio information 126 at t3, and the data, video, and/or audio information 128 at t4 included in the program 0 is expressed on a time axis. FIG. 6 illustrates in greater detail the process for decoding and outputting the data, video, and/or audio information 122 at t1.

In each of the data, video, and/or audio information items, the DTS that is a time for decoding the packet is included. First, a DTS 132 is included in data information D0(t1) and at the DTS 132, decoding of the data information begins. Also, a DTS 134 is included in video information V0(t1) at t1, and at the DTS 134, decoding of the video information begins. Likewise, a DTS 136 is included in audio information A0(t1) at t1, and at the DTS 136, decoding of the audio information begins. Before being blended in the blender 90, the decoded results are stored in the video buffer 40, the audio buffer 50, and the data buffer 60, respectively, for example as described above with reference to FIG. 2, and are awaiting presentation. Thus, by storing the decoded results in the respective buffers, the presentation of the video, audio, and data can be made from the time point when the decoding of the data begins. In the second embodiment, however, since the data information is first decoded, if only the data buffer 60 is filled, the PTS of caption information can be adjusted even without the video buffer 40 or the audio buffer 50 according to the exemplary embodiment of the present invention.

Next, in order to synchronize with the caption information or in order to adjust the PTS of the caption information, the screen presentation timestamp adjusting unit 70 such as the one described above can adjust the PTS of data, video, and/or audio information so that the data, video, and/or audio information is presented in a PTS adjustable interval 146 after the time point 142 when the decoding of the video information is finished. Accordingly, by adjusting and synchronizing the PTSs of the data, video, and/or audio information, the information can be output. In addition, by applying a time input by the user to the PTSs of the data, video, and audio information, the PTS of caption information can be arbitrarily adjusted. For example, the caption information can be output before video information or can be delayed and output after the video information. In the second embodiment of the present invention, the adjustment is possible only when the transmission side changes the order of packets and transmits the packets in the order of data, video, and audio. However, since the data is first transmitted and decoded in the second embodiment, the PTS adjustable interval 146 is relatively wider than that of the first embodiment.

Figure 2:
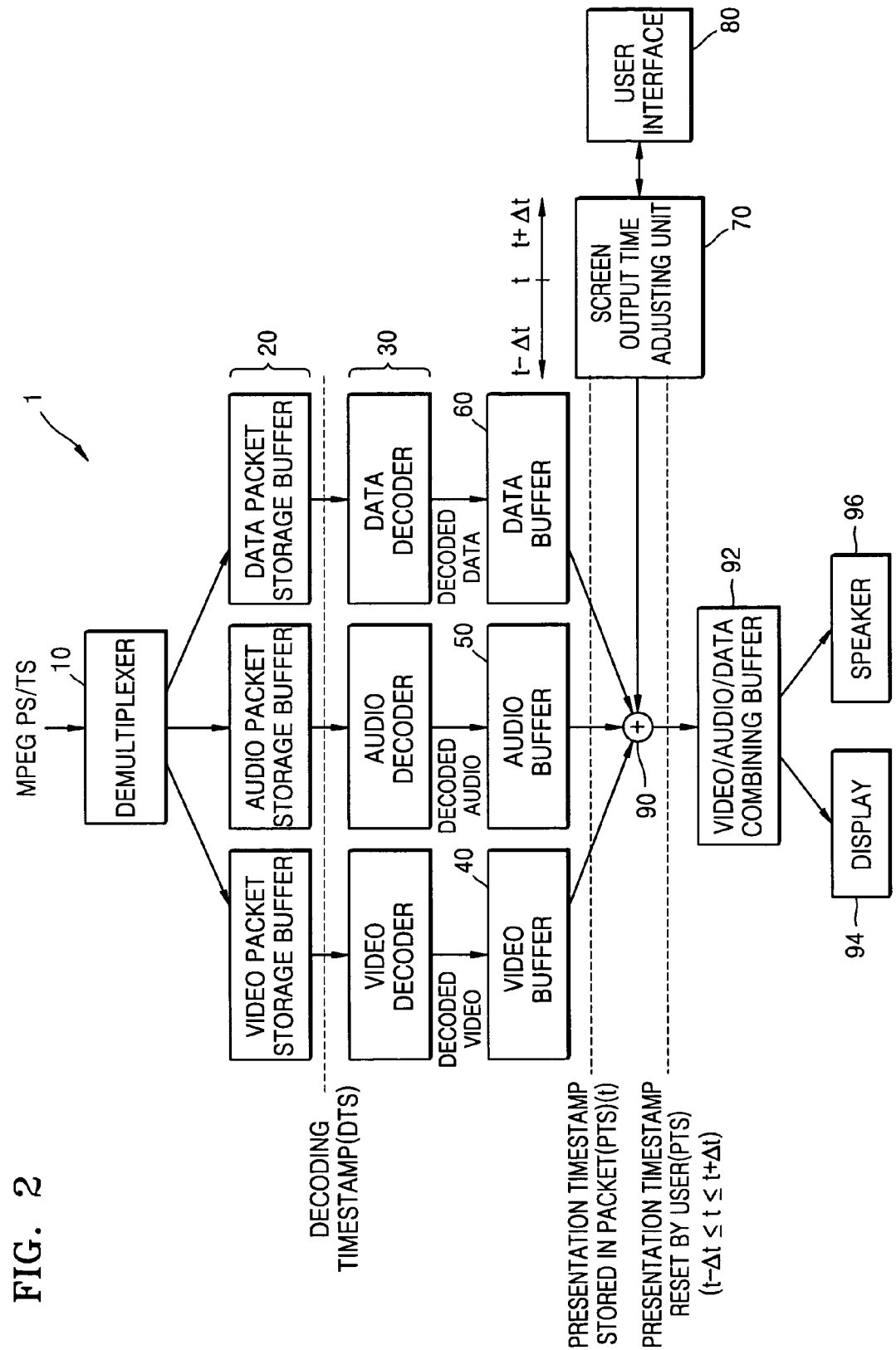
FIG. 2 is a block diagram of a multimedia apparatus for adjusting the presentation timestamp of caption information according to an exemplary, non-limiting embodiment of the present invention.

Also, in the case of the second embodiment, though the user does not adjust the output time by inputting a value to adjust the output time in the screen output time adjusting unit 70 through the user interface 80 of FIG. 2, the data packet is decoded first and therefore, the problem that a video screen does not match caption information due to the delayed output time may be solved.

The exemplary method of adding an output time reset by the user to an output time stored in a packet, or subtracting an output time reset by the user from an output time stored in a packet after decoding video, audio, and data packets is described above. Meanwhile, when the user performs manipulation to adjust an output time, the apparatus for adjusting an output time according to an exemplary, non-limiting embodiment of the present invention can also adjust the output time of caption information by adjusting a decoding timestamp (DTS) indicating a time when video, audio and data packets are decoded.

Referring to FIG. 2, a multimedia transport stream is demultiplexed into video packets, audio packets, and data packets through the demultiplexer 10, and the demultiplexed packets are temporarily respectively stored in the video packet storage buffer, audio packet storage buffer, and data packet storage buffer of the storage buffers 20. If a time is input by the user through the user interface 80, the screen output time adjusting unit 70 can reset the DTS of the data packets by advancing or delaying the DTS as much as the time input by the user, before the video, audio and data packets are decoded.

Figure 7:
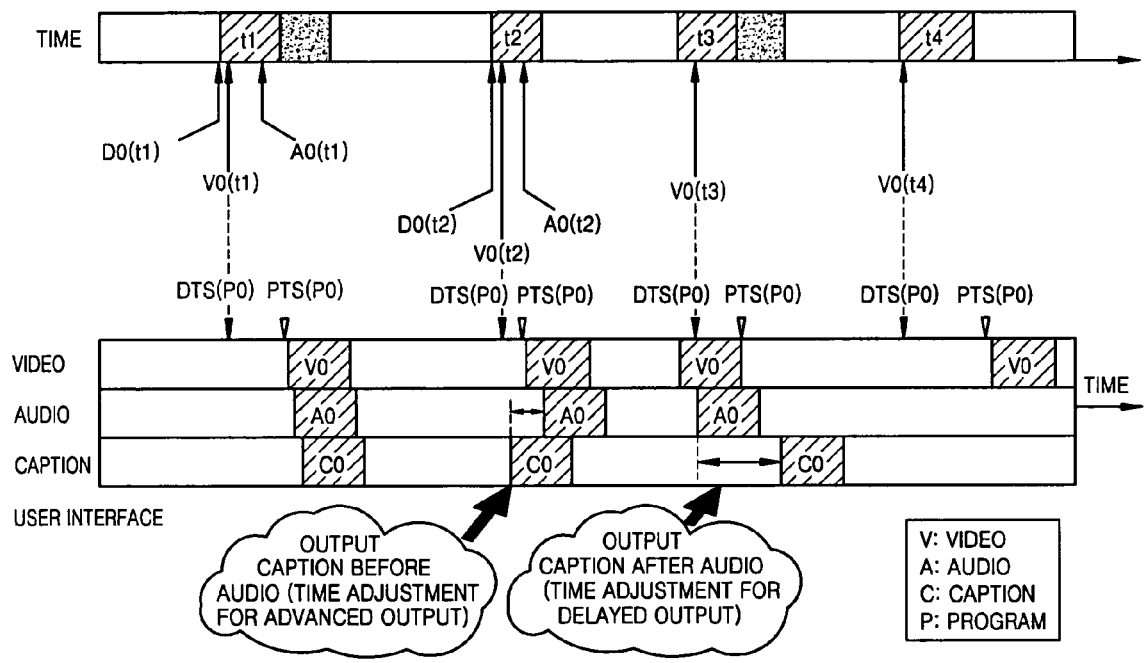
FIG. 7 illustrates adjusting the presentation timestamp of caption information according to an exemplary, non-limiting embodiment of the present invention.

FIG. 7 illustrates adjusting the presentation timestamp of caption information according to an exemplary, non-limiting embodiment of the present invention.

Referring to FIG. 7, with the PTS of video information or audio information as a reference, the PTS of caption (data) information can be synchronized. Also, by receiving an input of a user and advancing or delaying the PTS of caption information with the PTS of video information or audio information as a reference, the PTS of the caption information can be arbitrarily adjusted.

Figure 8:
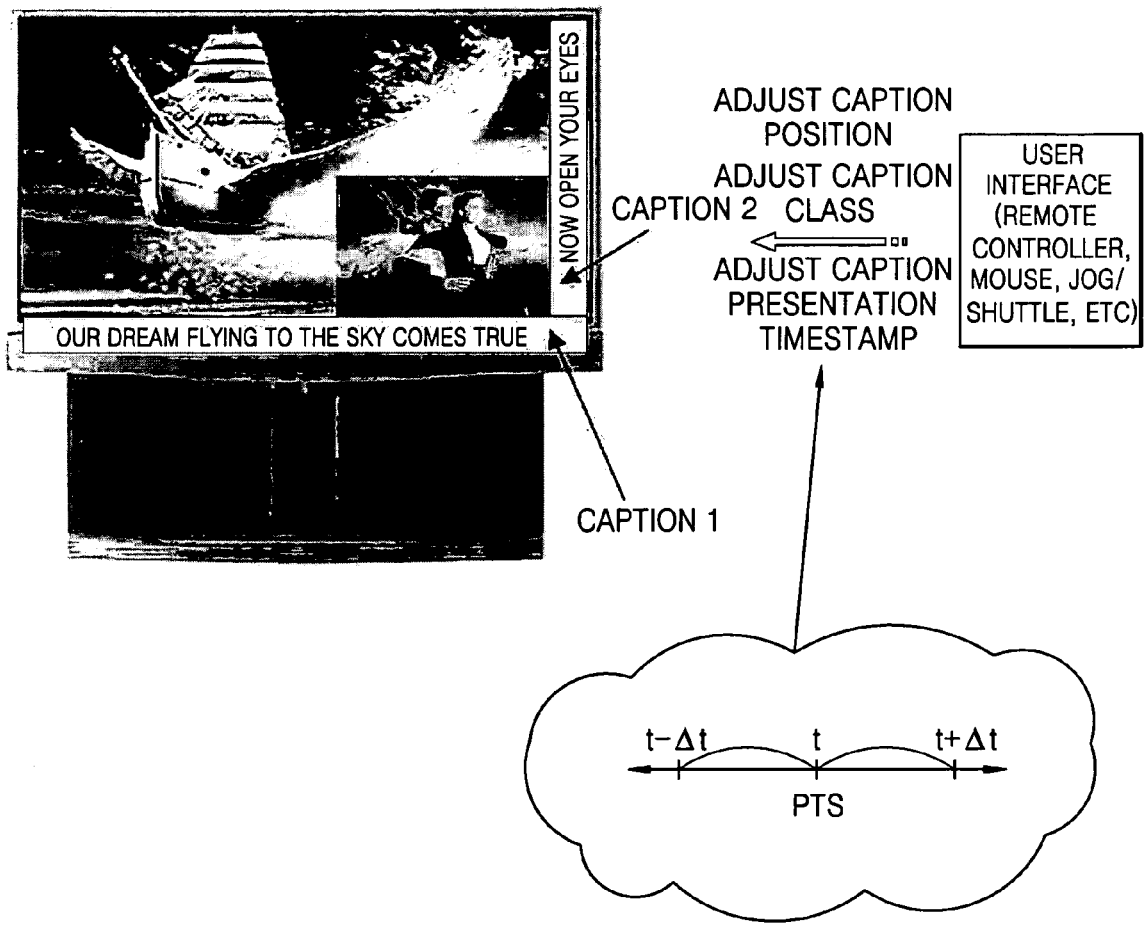
FIG. 8 illustrates a user interface for adjusting the presentation timestamp of caption information according to an exemplary, non-limiting embodiment of the present invention.

FIG. 8 illustrates a user interface for adjusting the presentation timestamp of caption information according to an exemplary, non-limiting embodiment of the present invention.

Referring to FIG. 8, through a user interface such as a remote controller, a direction key, or a jog/shuttle, a time value $\Delta t$ for adjusting the PTS of caption information is received from the user. Then, with the PTS t of video or audio information as a reference, the PTS of caption information is reset to $(t+\Delta t)$ or $(t-\Delta t)$ such that the PTS of the caption can be adjusted as the user wants.

A method of adjusting a caption position and a caption output class by using the user interface in FIG. 8 will be explained in greater detail below.

Figure 9:
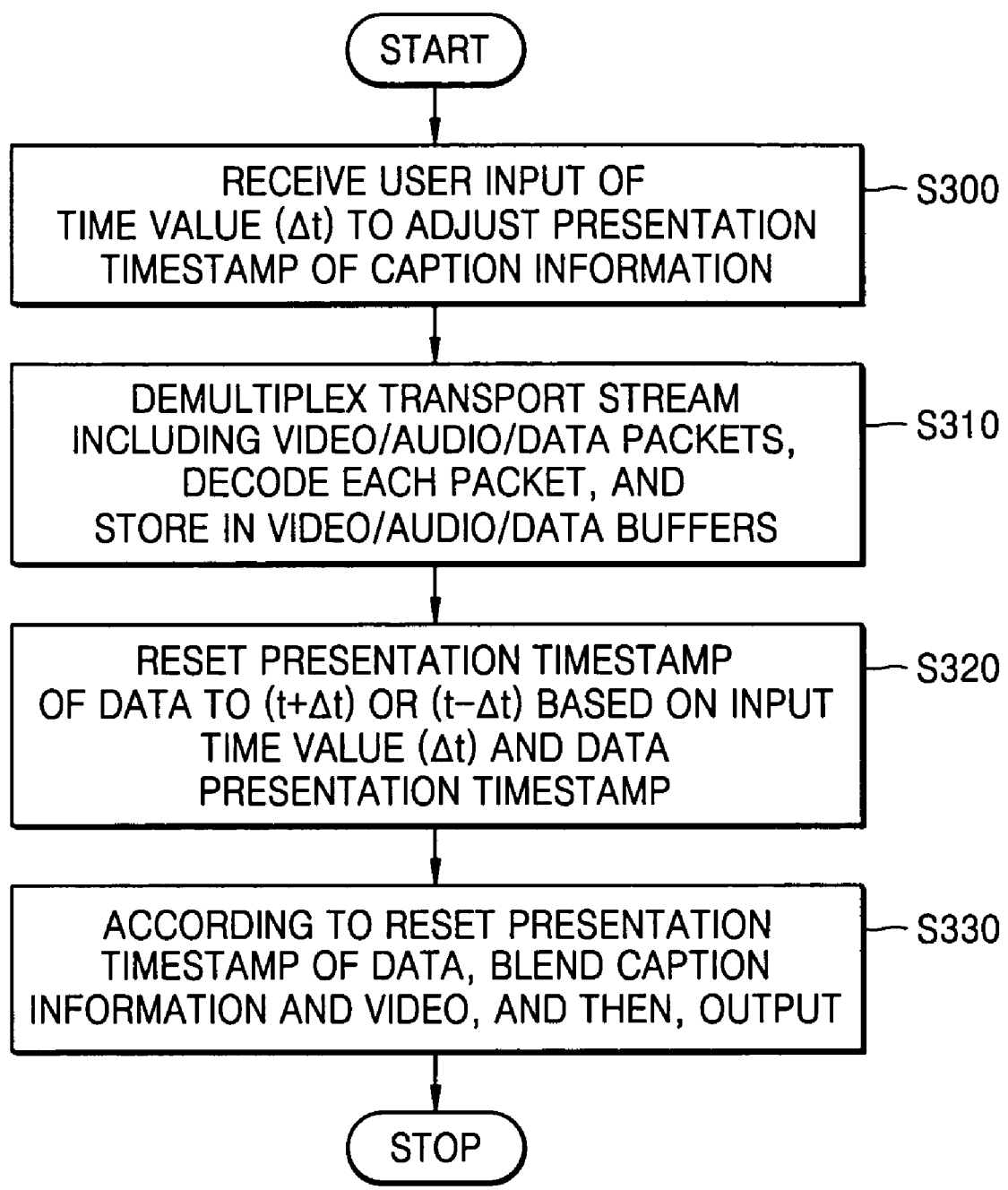
FIG. 9 is a flowchart of a method of adjusting the presentation timestamp of caption information according to an exemplary, non-limiting embodiment of the present invention.

FIG. 9 is a flowchart of the operations performed by a method of adjusting the presentation timestamp of caption information according to an exemplary, non-limiting embodiment of the present invention.

Referring to FIG. 9, first, in order to adjust the PTS of caption information, a time value for adjusting the PTS of caption information from the user is received through the user interface 80 in operations 300. A multimedia transport stream is demultiplexed, separated into video, audio and/or data packets, and the packets are decoded respectively.

The decoded results are stored in the corresponding buffer of the video buffer 40, the audio buffer 50, and the data buffer 60 in operations 310. By applying the input time value to the PTS included in the video or audio packet, the PTS of the caption information is reset in operations 320. According to the reset PTS of the caption information, the caption information of the data buffer 60 is blended with the video information and output on the screen in operations 330.

Figure 10:
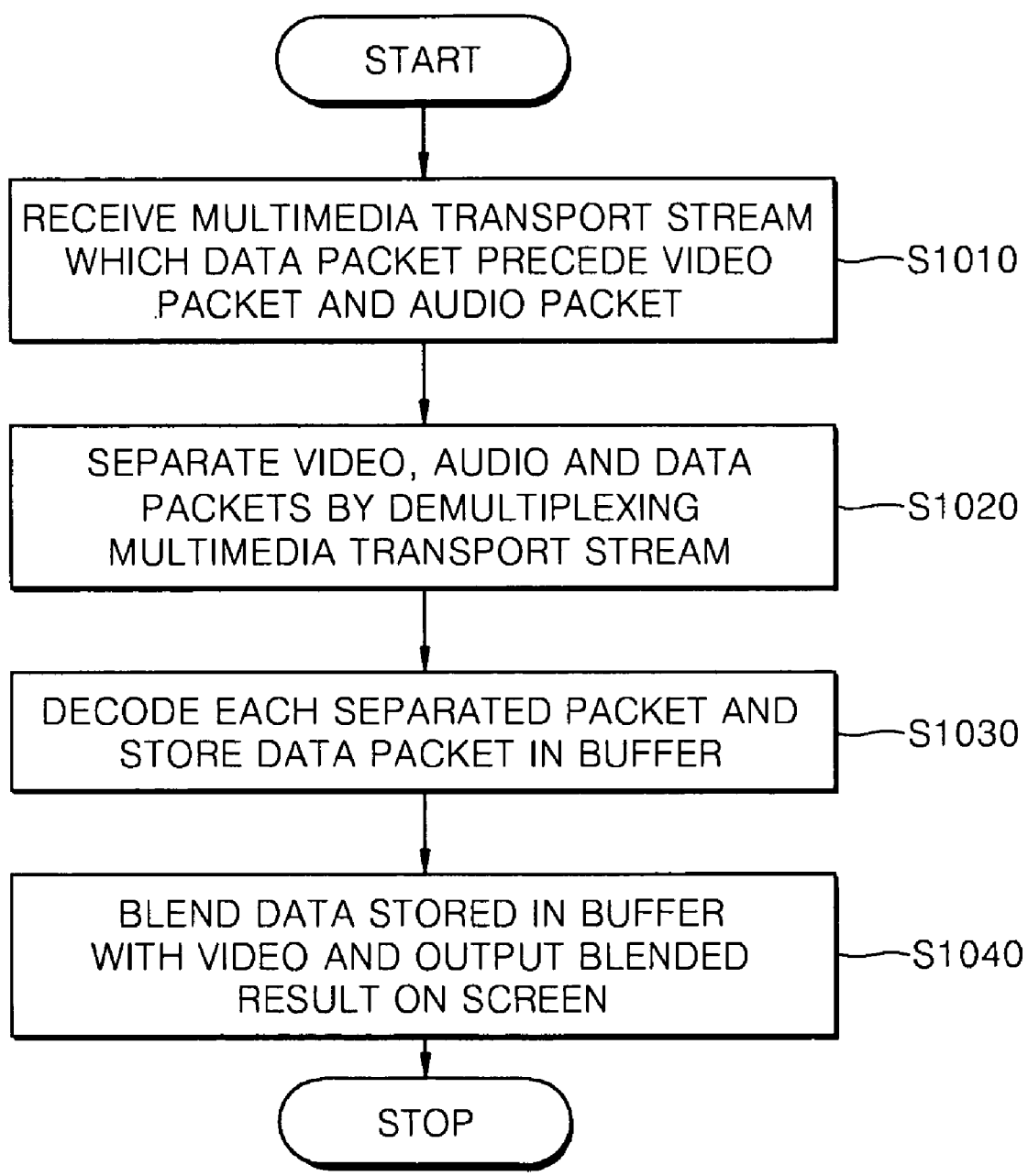
FIG. 10 is a flowchart of a method of adjusting the presentation timestamp of caption information according to yet another exemplary, non-limiting embodiment of the present invention.

FIG. 10 is a flowchart of a method of adjusting the presentation timestamp of caption information according to yet another exemplary, non-limiting embodiment of the present invention.

A multimedia transport stream, in which packets are arranged so that data packets precede video packets and audio packets, is received in operation S1010.

The multimedia transport stream is demultiplexed to separate video, audio, and data packets in operation S1020, and the separate packets are decoded and the decoded data packets are stored in a respective buffer in operation S1030. The buffer includes a data buffer and may further include a video buffer and/or audio buffer.

The data stored in the buffer is blended and output on the screen in operation S1040. Even when the multimedia transport stream, in which packets are arranged so that data packets precede video packets and audio packets, is received, a time value to adjust the output time of caption information can be input by a user through a user interface. In this case, by adding the input time value to or subtracting the input time value from an output time included in a video or audio packet, the output time of the caption information can be reset, and according to the reset output time of the caption information, the data stored in the buffer can be blended with the video and output on the screen.

Figure 11:
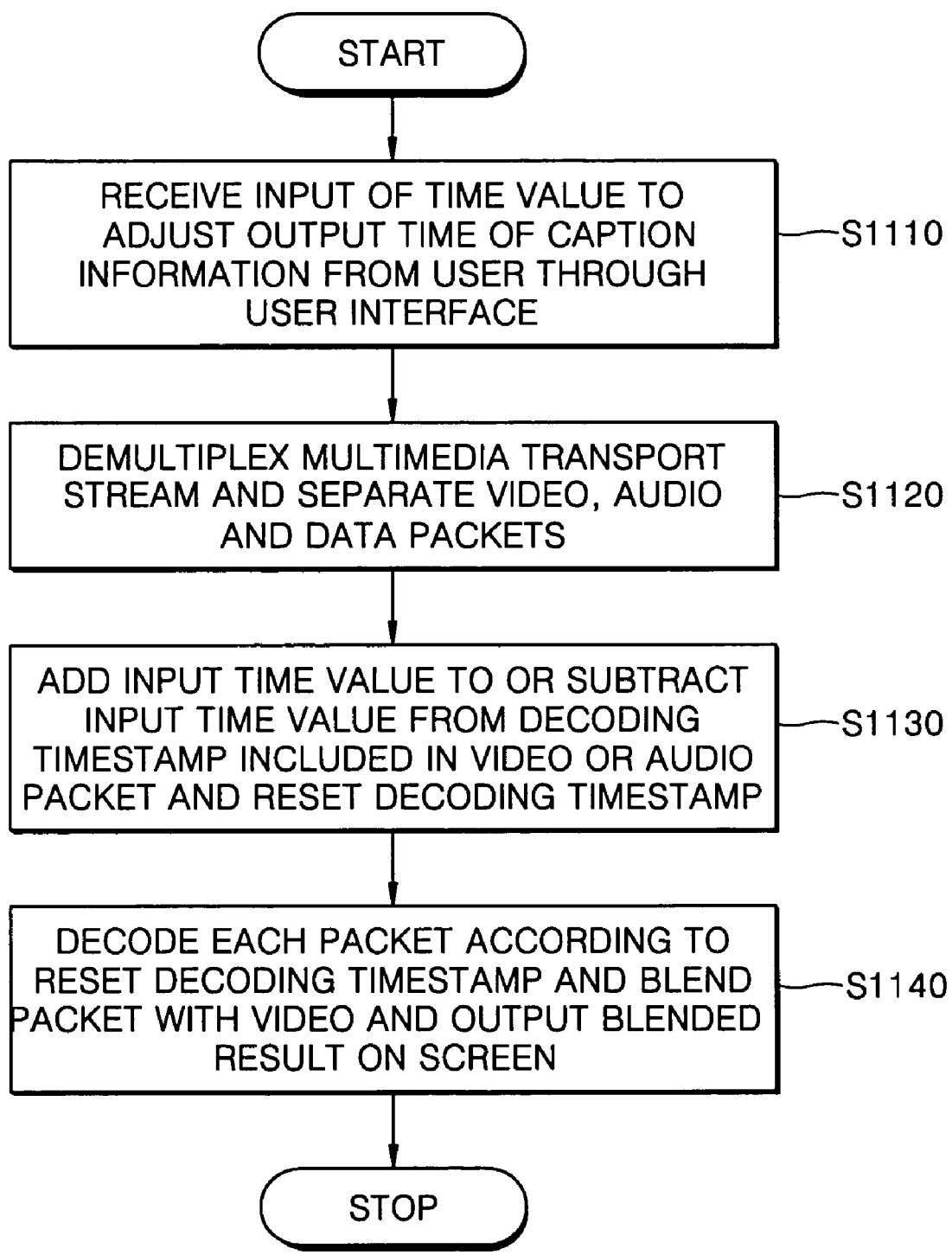
FIG. 11 is a flowchart of a method of adjusting the presentation timestamp of caption information according to yet another exemplary, non-limiting embodiment of the present invention.

FIG. 11 is a flowchart of a method of adjusting the presentation timestamp of caption information according to another exemplary, non-limiting embodiment of the present invention.

A time value to adjust an output time of caption information is input from the user through the user interface in operation S1110. At this time, the input time value is a relative value to be added to or subtracted from the DTS of video or audio packets.

A multimedia transport stream is demultiplexed to separate video, audio, and data packets in operation S1120. The separated video, audio, and data packets may be stored in a respective packet buffer. By adding the input time value to or subtracting the input time value from the DTS included in a video or audio packet, the DTS is reset in operation S1130. According to the reset DTS, each packet is decoded and blended with video packets and output on the screen in operation S1140.

FIG. 12 illustrates an example of caption output classes showing output priorities of caption information according to an exemplary, non-limiting embodiment of the present invention.

The caption information may be caption for audio of a program being currently provided or advertisement related to the program. When a plurality of caption information items are thus provided at the same time, a service provider transmitting the multimedia transport stream can specify an output class and provide the caption information.

The caption output class can be specified from 0 to 4, as shown in FIG. 12. The caption information according to this output class can be priced each second. For example, caption output classes 0 and 1 can be priced 100 won and 80 won, respectively, per second. According to the caption output class and the price per second, the output priority of caption information can be determined highest, high, normal, low, and lowest. Accordingly, for example, a client who wants to use caption information as an advertisement can pay charges to the service provider with respect to a caption output class and provide advertisements as caption information. This caption output class, price per second, and output priority can be changed according to the service provider who sets up and transmits the multimedia transport stream.

The service provider who sets up and transmits the multimedia transport stream can make and use a standard for this caption output class, price per second and output priority according to the caption information. Accordingly, a service provider providing foreign language subtitles through the caption information, and a caption information provider, that is, a client, who wants to provide advertisements using the caption information, can set up and provide caption output classes in addition to caption information, with respect to the importance of an advertisement to be provided as caption information.

Figure 13:
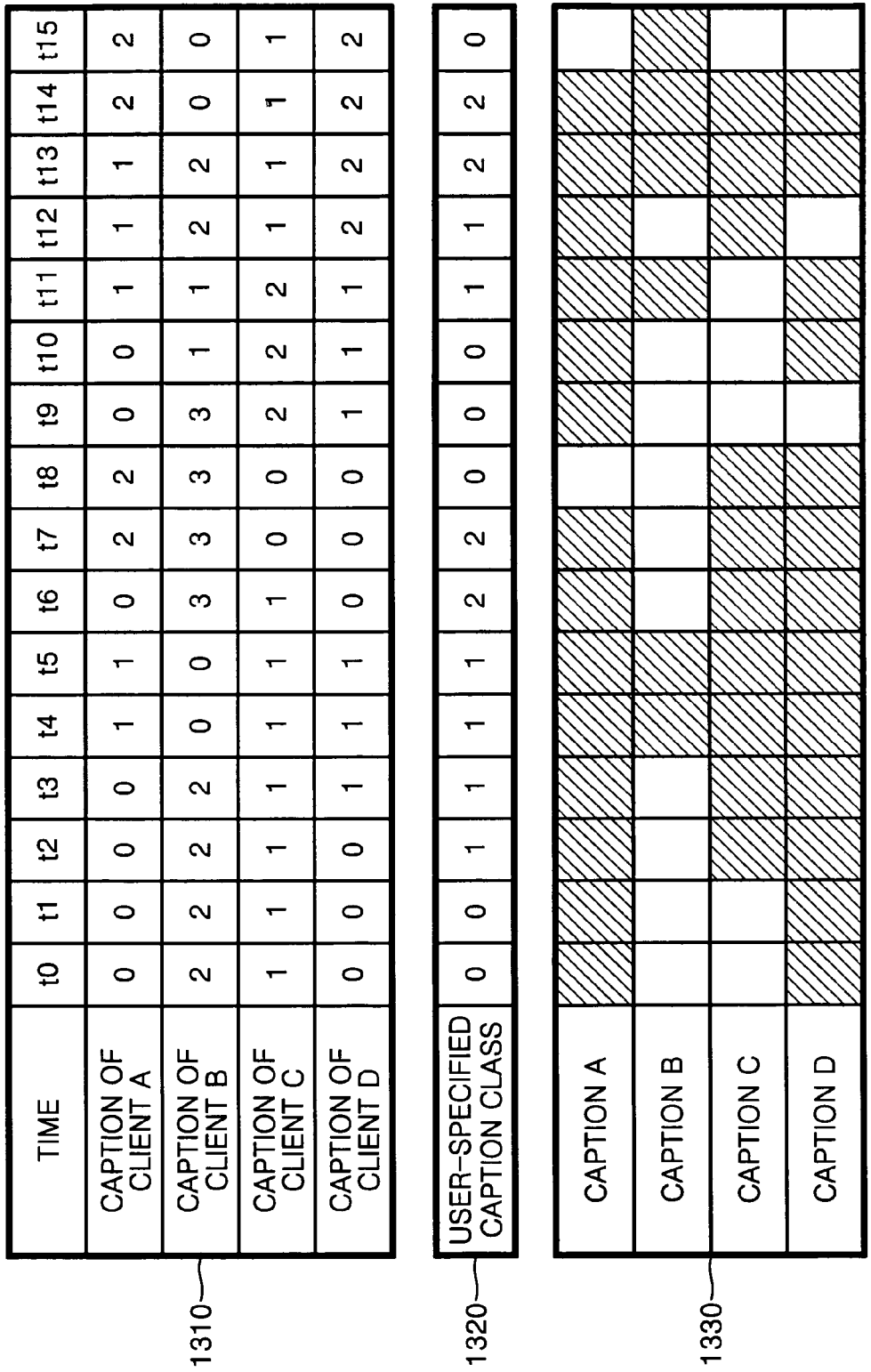
FIG. 13 illustrates tables of output classes of caption information organized by client, user-specified caption class, and caption information to be provided on the screen according to an exemplary, non-limiting embodiment of the present invention.

FIG. 13 illustrates tables of output class of caption by client, user-specified caption class, and caption information to be provided on the screen according to an exemplary, non-limiting embodiment of the present invention.

Referring to FIG. 13, a table 1310 shows the output classes of captions in relation to clients with respect to time. In the table 1310, t is a predetermined time unit and can be set arbitrarily. For example, t may be a second unit or a minute unit. In the table 1310, it can be seen that clients A, B, C, and D set caption output classes in each predetermined time according to their respective caption information.

A table 1320 is a table for user-specified caption classes set by a user using a user interface. By manipulating the user interface, the user may select a predetermined number of caption information items among a plurality of caption information items provided by clients, or by setting at every predetermined time a class for caption information, which the user desires to watch. That is, the caption information can be set so that the user watches only the desired caption information among the plurality of caption information items.

A table 1330 shows caption information that can be provided to the user, in relation to clients, when both the clients set the caption output classes, as shown for example in the table 1310, and the user sets the user-specified caption classes, as shown for example in the table 1320. For example, when caption A is provided by the client A from t0 to t8, first, the caption class of the client A is set as 000011022 from t0 to t8, and the user-specified caption class is set as 001111220. Since caption information that can be output and provided to the user should have an output priority equal to or higher than the priority of the user-specified caption class, caption A is output from t0 to t7 and is not output at t8.

Meanwhile, the caption information and the caption output class information can be generated so that anyone can use the information or so that users who can receive the caption information can be limited in order to provide the caption information through a predetermined broadcasting. In order to limit users who can receive caption information, the caption information and the output priority class information can be encoded or encrypted in an MPEG-2 syntax. For example, in order to provide caption information to only predetermined users selected through membership subscription, a client who is a caption information provider can provide an encryption key to the users in advance to restrict the use of the caption information so that only the users receiving the encryption key can use the caption information.

Figure 14:
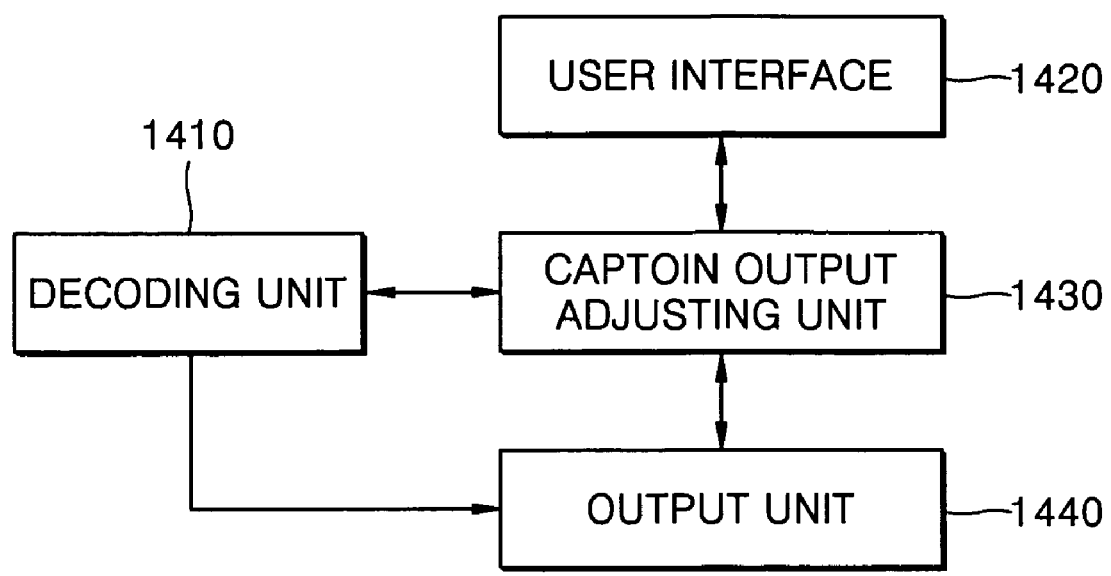
FIG. 14 is a block diagram of a structure of an apparatus for adjusting a caption output priority according to an exemplary, non-limiting embodiment of the present invention.

FIG. 14 is a block diagram of a structure of an apparatus for adjusting a caption output priority according to an exemplary, non-limiting embodiment of the present invention.

The apparatus for adjusting a caption output priority includes a decoding unit 1410, a user interface 1420, a caption output adjusting unit 1430, and an output unit 1440. The decoding unit 1410 includes a demultiplexer, a video/audio/data packet storage buffer, a video/audio/data decoder, such as the decoding unit of FIG. 2, and demultiplexes a multimedia transport stream, separates video, audio, and data packets, and decodes each packet.

The user interface unit 1420 receives input information relating to user-specified caption classes from a user through a user interface.

The caption output adjusting unit 1430 selects caption information having a caption output class equal to or higher than the user-specified caption class as specified by the user, among caption information items having a caption output class at each predetermined time unit, together with a screen output time, in the caption information included in a decoded packet. Then, the caption output adjusting unit 1430 outputs the selected caption information to the output unit 1440.

The output unit 1440 may include a blender, a video/audio/data combining buffer, a display and a speaker such as the output unit of FIG. 2, and blends the set caption information with video and outputs the blended result. If caption position information is input to the caption output adjusting unit 1430 through the user interface 1420 in addition to the above information, the output unit 1440 can output the selected caption information on the screen based on the caption position information.

Thus, using the apparatus for adjusting a caption output time and a caption priority according to an exemplary embodiment of the present invention, the user can adjust the caption output class and the caption position in addition to adjusting the caption output time through the user interface. Accordingly, with the user interface, the user can specify a user caption class such as the table 1320 or adjust the position of the selected and output caption information so that the selected and output caption information can be displayed on a desired position.

Figure 15:
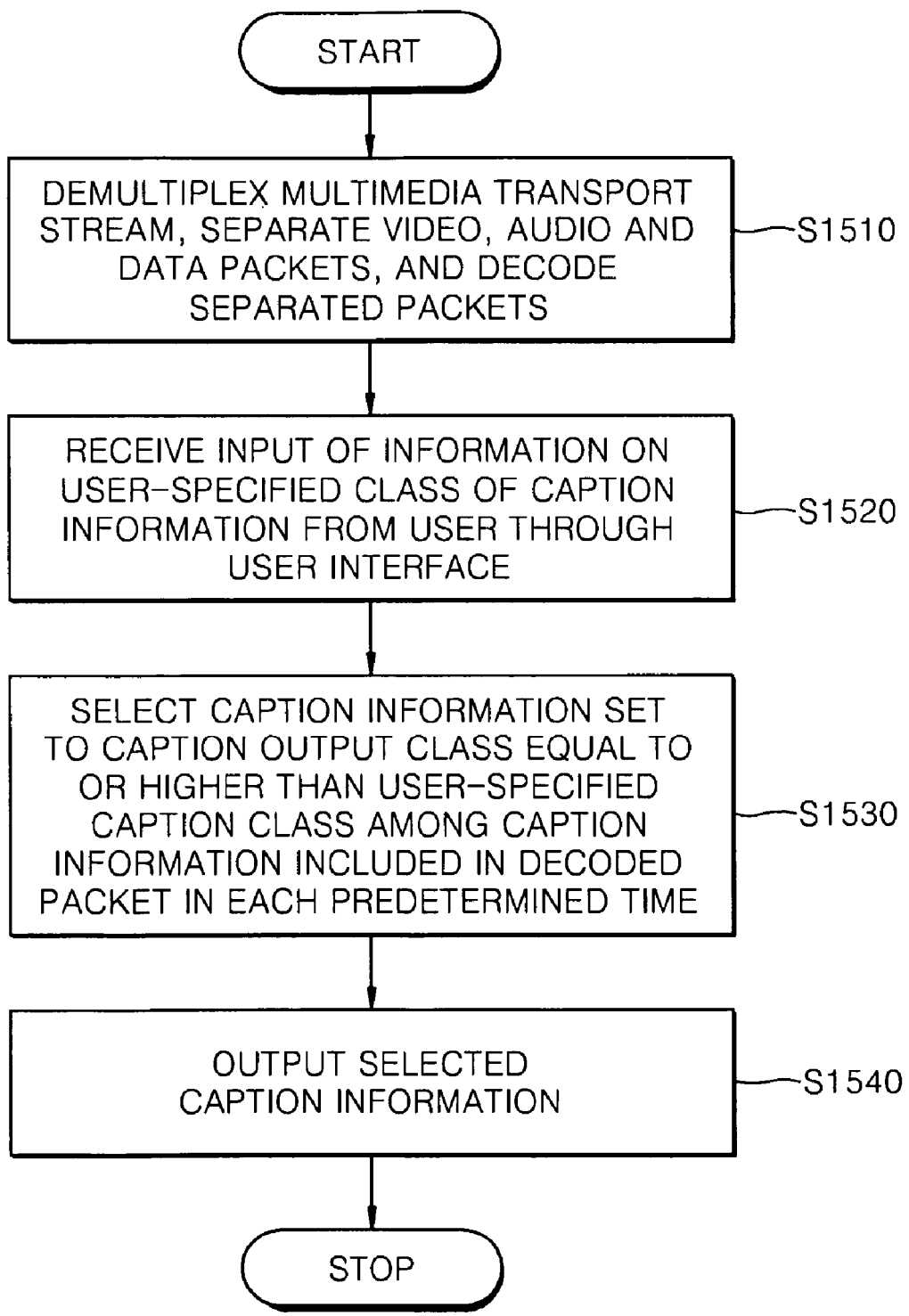
FIG. 15 is a flowchart of a method of controlling a caption output priority according to an exemplary, non-limiting embodiment of the present invention.

FIG. 15 is a flowchart of a method of controlling a caption output priority according to an exemplary, non-limiting embodiment of the present invention.

A multimedia transport stream is demultiplexed to separate video, audio, and data packets, and the separated packets are decoded in operation S1510. Through a user interface, information on the user-specified caption class of caption information is input from a user in operation 1520.

Among caption information items included in a decoded packet, a caption information item with a set caption output class equal to or higher than the user-specified caption class is selected at each predetermined time in operation S1530. The selected caption information is output in operation S1540. When caption position information is input by the user through the user interface, the caption information can be output on a desired position based on the caption position information. Also, as described above, in order to limit users who can output caption information, the caption information and caption output class information can be encoded or encrypted in the MPEG-2 syntax.

Meanwhile, the method of adjusting the output time and output priority of caption information according to exemplary embodiments of the present invention can be implemented as a computer program. Codes and code segments forming the program can be easily inferred by the programmers in the technological field of the present invention. Also, the program is stored in computer readable media, and read and executed by a computer to implement the method of adjusting output time of caption information. The computer readable media includes magnetic recording media, optical recording media, and carrier wave media.

While the present invention has been particularly shown and described with reference to exemplary embodiments thereof, it will be understood by those of ordinary skill in the art that various changes in form and details may be made therein without departing from the spirit and scope of the present invention as defined by the following claims. The exemplary embodiments should be considered in a descriptive sense only and not for purposes of limitation. Therefore, the scope of the invention is defined not by the detailed description of the invention but by the appended claims, and all differences within the scope will be construed as being included in the present invention.

According to exemplary embodiments the present invention as described above, a method of adjusting arbitrarily the output time of caption information included in a received multimedia transport stream for broadcasting, by an input of a user, and an apparatus thereof are provided.

According to the method and apparatus, the caption information can be presented synchronized with a video or audio signal, or the output time of the caption information can be advanced or delayed. This can be applied to teletext broadcasting synchronized with video signals for deaf and hard of hearing people, or to a foreign language study process where a caption is needed to be displayed after and/or before the video and voice are presented. In addition, this can be applied to a variety of fields such as advertisement, remote ordering during broadcasting, and providing additional information related to a program such as a movie or a show.

Also, according to exemplary embodiments of the present invention, a method and an apparatus capable of displaying only desired caption information on a desired position on a screen according to an input of a user, among a plurality of caption information items included in a received broadcasting multimedia transport stream, can be provided.

What is claimed is:

1. A method of adjusting output time of caption information included in a multimedia transport stream, the method comprising:
    receiving an input of a time value for adjusting the output time of the caption information, from a user through a user interface;
    by demultiplexing the multimedia transport stream, dividing the multimedia transport stream into a video packet, an audio packet, and a data packet comprising the caption information, decoding each packet, and storing the decoded packets in buffers corresponding to a type of packet;
    resetting the output time of the caption information by adding the input time value to or subtracting the input time value from an output time included in at least one of the video packet and the audio packet, after the decoding of each packet;
    according to the reset output time of the caption information, blending the caption information of the data packet stored in the buffer with at least one of video information and audio information respectively of the video packet and the audio packet; and
    presenting the blended information on a screen.

2. The method of claim 1, wherein in the receiving of the input, the user interface comprises at least one of a remote controller, a direction key, and a jog/shuttle.

3. The method of claim 1, wherein the input time value is a relative value that is added to or subtracted from the output time of the at least one of video and audio information.

4. The method of claim 1, wherein the buffer comprises a data buffer, and at least one of a video buffer and an audio buffer.

5. The method of claim 1, wherein the output time is a presentation timestamp.

6. The method of claim 1, wherein the multimedia transport stream is a stream multiplexed in order of video, audio, and data information.

7. An apparatus for adjusting output time of caption information included in a multimedia transport stream, the apparatus comprising:
- a user interface receiving an input of a time value for adjusting the output time of the caption information, from a user;
- a decoding unit configured to demultiplex the multimedia transport stream, divide the transport stream into video packet, audio packet, and data packet comprising the caption information, decode each packet, and store the decoded packets in buffers corresponding to each packet type;
- an output time adjusting unit resetting the output time of the caption information by adding the input time value to or subtracting the input time value from output time included in at least one of the video packet and the audio packet, after the decoding of each packet; and
- an output unit, according to the reset output time point of the caption information, blending the caption information of the data packet stored in the buffer with the video information of the stored video packet and presenting the blended information on a screen.

8. The apparatus of claim 7, wherein the user interface comprises at least one of a remote controller, a direction key, and a jog/shuttle.

9. The apparatus of claim 7, wherein the input time value is a relative value that is added to or subtracted from the output time of at least one of video information and audio information.

10. The apparatus of claim 7, wherein the buffer comprises a data buffer and at least one of a video buffer and an audio buffer.

11. The apparatus of claim 7, wherein the output time is a presentation timestamp.

12. The apparatus of claim 7, wherein the multimedia transport stream is a stream multiplexed in order of video, audio, and data information.

13. A non-transitory computer readable recording medium having embodied thereon a computer program for executing a method of adjusting output time of caption information included in a multimedia transport stream, the method comprising:
- receiving an input of a time value for adjusting the output time of the caption information, from a user through a user interface;
- by demultiplexing the multimedia transport stream, dividing the multimedia transport stream into video packets, audio packets, and data packets, decoding each packet, and storing the decoded packets in buffers corresponding to a type of packet;
- resetting the output time of the caption information by adding the input time value to or subtracting the input time value from an output time included in at least one of the video packets and the audio packets, after the decoding of each packet;
- according to the reset output time of the caption information, blending the caption information of the data packets stored in the buffer with at least one of video information and audio information respectively of the video packets and the audio packets; and
- presenting the blended information on a screen.

* * * * *